United States Patent [19]

Kogasaka

[11] Patent Number: 4,952,777

[45] Date of Patent: Aug. 28, 1990

[54] ELECTRIC HEAT-SEALING HEATER HAVING A FLEXIBLE HEAT ACCUMULATING SEALING SURFACE

[75] Inventor: Yoshihiro Kogasaka, Odawara, Japan

[73] Assignee: Fuji Photo Film Co., Ltd., Kanagawa, Japan

[21] Appl. No.: 337,687

[22] Filed: Apr. 13, 1989

[30] Foreign Application Priority Data

Apr. 13, 1988 [JP] Japan .................................. 63-90949

[51] Int. Cl.$^5$ .......................... H05B 3/00; B30B 15/34
[52] U.S. Cl. .................................. 219/243; 156/583.3;
156/583.7; 219/228; 219/535; 219/549
[58] Field of Search ............... 219/228, 243, 535, 549;
156/583.3, 583.7

[56] References Cited

U.S. PATENT DOCUMENTS

| | | | |
|---|---|---|---|
| 2,620,427 | 12/1952 | Mickel | 219/243 |
| 3,067,309 | 12/1962 | Chinn | 156/583.3 |
| 3,269,885 | 8/1966 | Cianci | 156/583.3 |
| 3,817,172 | 6/1974 | Horton | 219/243 X |
| 4,016,021 | 4/1977 | La Fleur | 156/583.3 |
| 4,445,025 | 4/1984 | Metz | 156/583.7 |

FOREIGN PATENT DOCUMENTS

| | | | |
|---|---|---|---|
| 1038672 | 9/1958 | Fed. Rep. of Germany | 219/243 |
| 522903 | 4/1955 | Italy | 219/243 |

Primary Examiner—Anthony Bartis
Attorney, Agent, or Firm—Sughrue, Mion, Zinn, Macpeak & Seas

[57] ABSTRACT

An electric heat-sealing heater has a flat heating sheet member having embedded therein a resistance heating element. The sheet member is supported on a rigid guide with an elastic rubber sheet interposed between the guide and the sheet member. A flexible copper heat accumulating block having a plurality of slits alternately extending in a direction transverse of the heater is positioned on the side of the heating sheet member opposite to the rubber sheet and is retained in place by a holder having a pair of arms and mounted on the guide. The flexible block is adapted to be pressed against the material to be heat-sealed and accommodates any uneven surfaces on the parts being sealed.

2 Claims, 2 Drawing Sheets

ELECTRIC HEAT-SEALING HEATER HAVING A FLEXIBLE HEAT ACCUMULATING SEALING SURFACE

BACKGROUND OF THE INVENTION

1. Field of the Invention invention relates to a heat-sealing heater for use in an overwrapper which applies heat under pressure to a wrapping film wrapped around an article such as a magnetic tape cassette and heat-seals overlapping portions of the film.

2. Description of the Prior Art

Conventionally, the heat-sealing heater for an overwrapper comprises a metal block such as of aluminum having a tubular heater element and a temperature sensor embedded therein, and the overwrapper applies heat under pressure to a wrapping film by use of the metal block and heat-seals overlapping portions of the film. Particularly, the conventional overwrappers for wrapping audiotape cassettes or videotape cassettes are arranged to owe the pressure required for the heat seal to repulsion of the article to be wrapped. Accordingly, depending on the shape of the portion of the article at which the overlapping portions of the wrapping film are heat-sealed, it is difficult to obtain a uniform heat-sealing pressure. For example, the plastic casing for the audiotape cassette generally has recesses in the outer surface thereof which are about 0.5mm in depth and are formed due to sinkage in injection molding of the casing. At the portions opposed to the recesses, the overlapping portions of the wrapping film cannot be pressed against each other under a sufficient pressure, which can lead to unsatisfactory heat sealing and to deterioration of the wrapping yield. Further, in the case of the videotape cassette, the rigidity of the material forming the casing is insufficient and accordingly, if the cassette accommodated in the casing has recesses, the overlapping portions of the wrapping film cannot be pressed against each other under a sufficient pressure at the portions opposed to the recesses.

Recently, there has been put into practice a flexible flat heater comprising a long heater element such as a winding embedded in a flexible flat material. Such a flexible flat heater may be expected to conform to some extent to the unevenness on the surface of the article to be wrapped and permit the overlapping portions of the wrapping film to be uniformly heat-sealed.

However, since the resistor circuit of the flat heater is generally formed by photo-etching a metal film about 10 to 100 μm thick in order to ensure flexibility of the heater, the flat heater cannot have a large heating capacity.

Also a flat heater having a Nichrome wire winding instead of the resistor circuit formed by photo etching of the metal film cannot have a large heating capacity.

Accordingly, when the flat heater is used as the heat-sealing heater for the overwrapper for wrapping the audiotape cassettes or the videotape cassettes, the temperature of the heater can be locally abruptly lowered at the moment when the heater is brought into contact with the wrapping film because the heat load of the cassette significantly varies from part to part. Accordingly, in order to obtain satisfactory heat sealing over the entire heat sealing area with such a flat heater, the heater must be pressed against the wrapping film for a longer time, which makes it difficult to increase the production speed. Though these problems may be overcome by the use of a rapid-response temperature control system, this approach adds much to the production cost.

SUMMARY OF THE INVENTION

In view of the foregoing observations and description, the primary object of the present invention is to provide a heat-sealing heater having a flexibility and a heating capacity which are sufficient to satisfactorily heat-seal the entire heat-sealing area within an acceptable time.

In accordance with the present invention, there a heat-sealing heater is provided which comprises a flat heating sheet member consisting of a flat flexible material and a long heater element embedded in the flexible material. The flat heating sheet member is supported on a guide, an elastic material is interposed between the flat heating sheet member and the guide, and a flexible heat-accumulating material is provided on the side of the flat heating sheet member opposite to the elastic material. The heat-accumulating material is adapted to be pressed against the material to be heatsealed.

The heat-accumulating material may owe its flexibility to the material forming itself or to its structural design. That is, the heat-accumulating material need not be formed of flexible material so long as it exhibits flexibility.

In the heat-sealing heater in accordance with the present invention, the article to be sealed is not brought directly into contact with the flat heating sheet member but with the heat-accumulating material which has a relatively large heating capacity. Because of the large heating capacity of the heat-accumulating material, the temperature of the heater cannot be locally abruptly lowered even if the heat load of the article to be sealed significantly varies from portion to portion.

Further, the flexibility of the entire heater is improved by the flexibility of the heat accumulating material and the flexibility of the elastic material interposed between the guide the flat heating sheet member. Accordingly, when the guide is pushed toward the article to press the heat-accumulating material against a heat-sealing area of a wrapping film wrapped around an article which has uneven surfaces, for instance, the surface of the heat-accumulating material in contact with the wrapping film is conformed to the surface of the article by virtue of the flexibility of the elastic material. Therefore, the flat heating sheet member, the heat-accumulating accumulating material, and the entire heat-sealing area of the wrapping film can be uniformly heated.

Furthermore, the heat-sealing heater in accordance with the present invention is advantageous in that the percentage of rejects is remarkably reduced. As a result of a test conducted by the inventor, the average percentage of rejects in the conventional heaters of about 1% was reduced to 0.05%.

Another advantage of this invention is that, owing to the above remarkably low percentage of rejects, there is no need to inspect the manufactured heaters. Practically, the number of the operators for inspection of the manufactured heaters was reduced to zero according to the present invention.

DESCRIPTION OF THE PREFERRED EMBODIMENT

Figure 2:
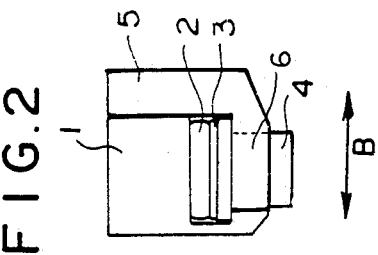
Figure 1:
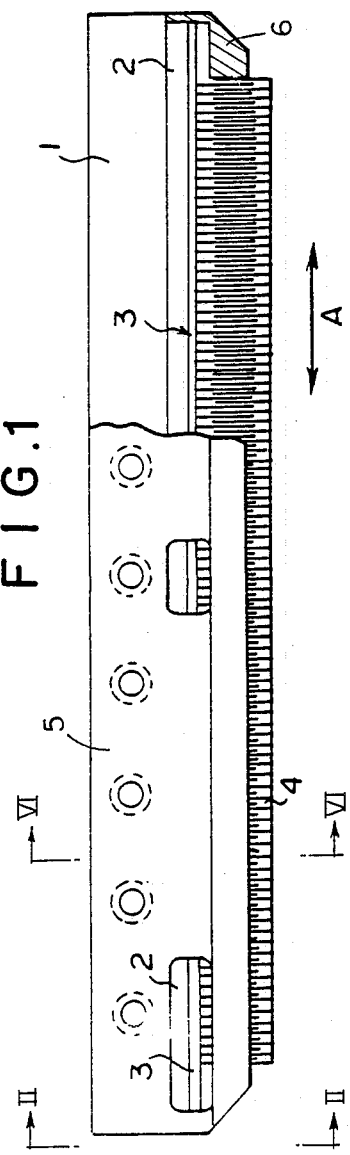
FIG. 1 is a front partial cutaway view of a heat-sealing heater in accordance with an embodiment of the present invention, FIG. 2 a side view of the heat-sealing heater in the direction II—II.
Figure 6:
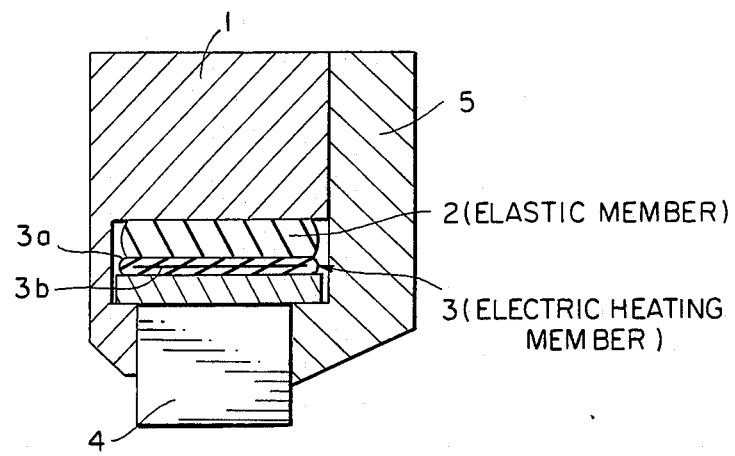
FIG. 6 is a sectional view taken along the line VI—VI of FIG. 1.

In FIGS. 1 and 2, a heat-sealing heater in accordance with an embodiment of the present invention comprises a guide 1 in the form of a duralumin block, and a heat-resistant rubber sheet 2 (as the elastic material), a flat heating sheet member (thermistorcontrolled heater) 3 and a heat-accumulating material block 4 superposed one on another in this order on the guide 1 (see FIG. 6.

The guide 1 is of a rigid body so that it can uniformly press the entire heater against the material to be heat-sealed. The guide 1 may be formed of various materials other than duralumin, e.g., aluminum. Further, as an example, the guide 1 may be 200mm × 30mm × 15mm in size.

The heat-accumulating material block 4 absorbs a part of unevenness on the surface against which it is pressed. The part of the unevenness on the surface which cannot be absorbed by the heat-accumulating material block 4 causes deformation of the flat heating sheet member 3. The heat-resistant rubber sheet 2 is for accommodating the deformation of the flat heating sheet member 3, and may be formed of other materials so long as it has sufficient elasticity.

Figure 3:
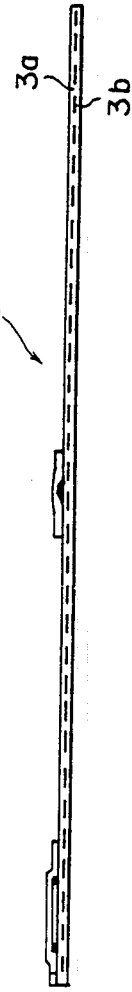
FIG. 3 is a front view showing the flat heating sheet member employed in the heat-sealing heater.
Figure 4:
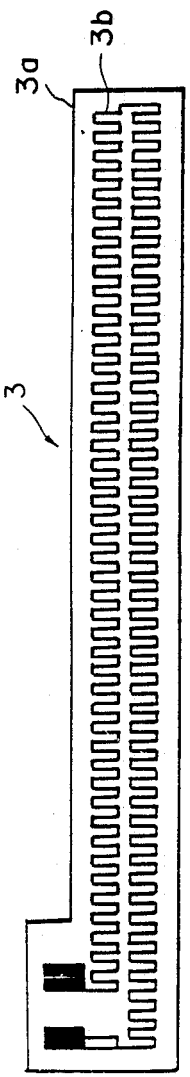
FIG. 4 is a plan view of the same.

As shown in FIGS. 3 and 4, the flat heating sheet member 3 comprises a flat insulating silicone rubber sheet 3a and a resistor circuit 3b which is formed by photo-etching a metal film about 10 to 100 μm thick and is embedded in the sheet 3a. Preferably the flat heating sheet member 3 is sized so as to be accommodated in the guide 1. For example, the flat heating sheet member 3 may be 155mm × 12mm × 1mm in size. For example, the rated output voltage of the heater may be about 49V and the rated power consumption of the heater may be about 120W.

Figure 5:
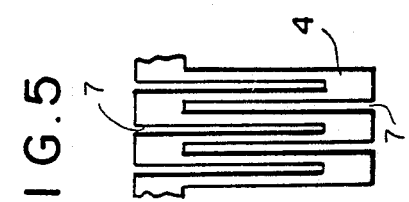
FIG. 5 is an enlarged fragmentary view showing a close-up side view the flexible block employed in the heat-sealing heater shown in FIG. 1.

The heat-accumulating material block 4 is a copper block provided with a plurality of slits (see FIG. 5) alternately extending in the transverse direction of the heater (the direction of arrow B in FIG. 2) from one side toward the other side and from said the other side toward said one side. By virtue of the slits, the heat accumulating material block 4 is given flexibility in the longitudinal direction thereof (the direction of arrow A in FIG. 1). The heat-accumulating material block 4 may be provided with a plurality of slits all extending from one side thereof. The width of each slit and the intervals between adjacent slits may be selected depending on the purpose of the heater. The heat accumulating material block 4 may be further provided with a plurality of slits extending in the longitudinal direction thereof so that the heat-accumulating material block 4 is given flexibility in the transverse direction thereof in addition to the flexibility in the longitudinal direction thereof. The copper block with the arrangement described above is optimal for the purpose of this embodiment because of its large heating capacity and its high heat conductivity. As the heat-accumulating material block, a laminated copper block comprising a plurality of copper plates processed in a predetermined manner may be used. In this case, the heat-accumulating material block 4 will have flexibility in the direction perpendicular to the surface of the copper plates. Further, the heat-accumulating material block may be formed by molding of 6:4 mixture (by volume) of fine silicone compound and spherical metal powder. The heat-accumulating material block may be of any material and structure so long as it has flexibility at least in one dimension and it has large heating capacity.

The heat-accumulating material block 4 is retained by a pair of arms 6 (see FIGS. 1 and 2 which are elongated from both ends of the holder 5 toward the guide 1 so that the assembled flexible heat accumulating material block 4 will be prevented from tilting excessively in the longitudinal direction of the heater when the surface of the block 4 is deformed by the sealing operation. Further, the holder 5 is combined with the guide 1 so that the heater forms a rectangle on the whole as shown in FIG. 2.

The heat-sealing heater of this particular embodiment is mainly used for heat-sealing overlapping portions of a wrapping film in an overwrapper for wrapping audio-tape cassettes or videotape cassettes.

That is, the heat-sealing heater of this particular embodiment is incorporated in an overwrapper for wrapping audiotape cassettes or videotape cassettes. When a wrapping film such as of polypropylene is wrapped around a tape cassette, the heat-sealing heater is brought into abutment against a surface of the cassette with the overlapping end portions of the wrapping film sandwiched therebetween. At this time, the heataccumulating material block 4 is brought into contact with the overlapping end portions of the wrapping film, and the heater is further lowered by a small distance from this state. Thus, the wrapping film is pressed against the surface of the tape cassette by the heatsealing heater. Since the heat-accumulating material block 4 has flexibility in the longitudinal direction of the heater and the elastic heat-resistant rubber sheet 2 is disposed between the guide 1 and the flat heating sheet member 3, the surface of the block 4 in contact with the wrapping film is deformed to conform to the unevenness on the surface of the cassette, whereby the overlapping end portions of the wrapping film to be heat-sealed together are sandwiched between the cassette surface and the heat-sealing heater under uniform pressure over the entire area thereof. The overlapping end portions are heated while being sandwiched between the cassette surface and the heat-sealing heater in the manner described above and heat-sealed together.

Since the heat-accumulating material block 4 is of copper and has large mass, large heating capacity and high heat conductivity, the temperature of the heater cannot be locally abruptly lowered at the moment when the heater is brought into contact with the wrapping film due to variation in heat load of the heat-sealing portion. Further, the temperature of the whole heat-accumulating material block 4 is quickly uninformed, and accordingly, heat sealing over the entire heat-sealing area can be accomplished in a short time.

I claim:

1. A heat-sealing heater comprising a flat heating sheet member which consists of a flat flexible material and a long heater element embedded in the flexible material and is supported on a guide, characterized in that an elastic material is interposed between the flat heating sheet member and the guide, and a flexible heat-accumulating material of high heat conductivity is provided on the side of the flat heating sheet member opposite to the elastic material, the heat-accumulating material being adapted to be pressed against the material to be heat-sealed; wherein said heat-accumulating material comprises a block having a plurality of slits alternately extending in a direction transverse of said heater; and further comprising a holder having a pair of arms and being mounted to said guide for retaining said block at opposite ends thereof.

2. A heat-sealing heater according to claim 1, further wherein said block is formed of copper.

* * * * *